United States Patent [19]
Horn

[11] Patent Number: 5,302,446
[45] Date of Patent: Apr. 12, 1994

[54] TWO-SIDED SKIN CARE WIPE MATERIAL AND METHOD FOR ITS MANUFACTURE

[75] Inventor: Drew Horn, Hingham, Mass.

[73] Assignee: International Paper Company, Purchase, N.Y.

[21] Appl. No.: 859,771

[22] Filed: Mar. 30, 1992

[51] Int. Cl.$^5$ .................... B32B 5/26; B32B 7/10; B32B 31/08; B32B 31/20

[52] U.S. Cl. .................... 428/286; 15/209.1; 156/73.1; 424/402; 428/287; 428/296; 428/298; 428/302

[58] Field of Search ............. 428/286, 287, 296, 298, 428/302; 156/73.1; 15/209.1

[56] References Cited

U.S. PATENT DOCUMENTS

| | | |
|---|---|---|
| 3,542,634 | 11/1970 | Such et al. |
| 3,966,519 | 6/1976 | Mitchell et al. .................... 156/73.1 |
| 4,239,792 | 12/1980 | Ludwa ............................ 128/156 |
| 4,259,399 | 3/1981 | Hill .................................. 428/288 |
| 4,287,251 | 9/1981 | King ................................ 428/198 |
| 4,377,615 | 3/1983 | Suzuki et al. ...................... 428/213 |
| 4,542,060 | 9/1985 | Yoshida et al. .................... 428/287 |
| 4,555,811 | 12/1985 | Shimalla ............................... 2/51 |
| 4,636,418 | 1/1987 | Kennard et al. ................... 428/110 |
| 4,659,614 | 4/1987 | Vitale ................................ 428/296 |
| 4,664,959 | 5/1987 | Dagenais et al. ................... 428/74 |
| 4,668,566 | 5/1987 | Braun .............................. 428/286 |
| 4,737,404 | 4/1988 | Jackson ............................ 428/284 |
| 4,753,843 | 6/1988 | Cook et al. ........................ 428/286 |
| 4,778,460 | 10/1988 | Braun et al. ........................ 428/198 |
| 4,784,892 | 11/1988 | Storey et al. ....................... 428/172 |
| 4,837,078 | 6/1989 | Harrington ........................ 428/284 |
| 4,883,707 | 11/1989 | Newkirk ............................ 428/286 |
| 4,906,513 | 3/1990 | Kebbell et al. .................... 428/198 |
| 4,913,957 | 4/1990 | Strack et al. ...................... 428/286 |

*Primary Examiner*—James C. Cannon
*Attorney, Agent, or Firm*—Ostrager, Chong & Flaherty

[57] ABSTRACT

A laminated fabric material suitable for use in wiping human skin has two plies of fibrous material bonded together. Each ply of fibrous material is a nonwoven web of fibers having a fiber composition consisting of at least 50 wt. % thermally fusible plastic fibers to ensure efficient lamination. In particular, one of the plies consists of 100 wt. % thermally fusible plastic fibers. This enables the plies to be ultrasonically bonded together at sufficiently high bonding speeds. In addition, for the side or sides where an image, for example, a logo, is to be bonded into the fabric, the high percentage of thermoplastic fibers is reduced to ensure that the visibility of the image is not diminished due to swelling of the cellulosic fibers during saturation in aqueous solution. The surfaces of at least some of the thermally fusible plastic fibers of both plies are treated to render the plastic fibers hydrophilic, for example, by coating with surfactant. One ply may have fibers which are relatively coarse, while the other ply has fibers which are relatively fine.

28 Claims, No Drawings

TWO-SIDED SKIN CARE WIPE MATERIAL AND METHOD FOR ITS MANUFACTURE

FIELD OF THE INVENTION

This invention generally relates to nonwoven fabric used to cleanse human skin and treat blemishes thereon. In particular, the invention relates to nonwoven fabric which can be die-cut to form pads of any geometric shape which are then saturated in skin-cleansing solution for use as a skin care wipe.

BACKGROUND OF THE INVENTION

It is known to construct skin care wipes from fabric material comprising laminated nonwoven webs of fibers. In one conventional material the fibers are chemically bonded together using acrylic latex. These wipes are soaked in an aqueous solution containing skin treatment chemicals. This conventional material has the disadvantage that formaldehyde can be produced in the end product. Due to the toxic nature of formaldehyde, this development is highly undesirable.

In a different skin care wipe material known in the prior art, two nonwoven webs are laminated by ultrasonic bonding over an area approximately equal to 25% of the web area. One web comprises 75 wt. % rayon fibers and 25 wt. % polypropylene fibers which are thermally bonded. The other web comprises 70 wt. % rayon fibers and 30 wt. % polyester fibers which are hydroentangled. A logo is embossed on the fabric using a customized anvil roll.

In another known skin care wipe material, two nonwoven webs are laminated by ultrasonic bonding over 12% of the web area. One web comprises a thermally bonded nonwoven web having a fiber composition of 69% rayon fibers, 25% polypropylene fibers and 6% cotton fibers. The other web comprises a hydroentangled nonwoven web having a fiber composition of 50% polyester fibers and 50% polyester/polypropylene (core/sheath) bicomponent fibers. Prior to lamination, the hydroentangled polyester fibers and bicomponent fibers are also bonded during the drying step as a result of radiational heat, causing the surfaces of the polypropylene sheaths of the bicomponent fibers to soften, if not melt, thereby thermally bonding at least some of the bicomponent and polyester fibers together.

This prior art material is disadvantageous in at least several respects. First, the layers having a high content of cellulosic fibers swell appreciably after the fabric is soaked for extended periods of time in an aqueous solution. As a result the visibility of the embossed image in such layers is diminished. Second, the rayon fibers partially insulate the polyester and polypropylene fibers from the heat generated by the ultrasonic vibration. As a result, the ultrasonic bonding is performed relatively inefficiently. Assuming that a constant level of ultrasonic power is available, the required dose of ultrasonic energy is attained by extending the duration of the ultrasonic bonding, resulting in slower production line speeds and increased manufacturing costs. Third, the high content of cellulosic fibers has the consequence that the peel strength of the ultrasonically bonded lamination is relatively low.

SUMMARY OF THE INVENTION

One object of the present invention is to overcome the aforementioned disadvantages of known laminated skin care wipe materials. In particular, it is an object of the invention to avoid using a latex binder which contains formaldehyde residuals.

Another object of the invention is to provide a laminated skin care wipe material having a bond area and point to point spacing such that the layer-to-layer bond strength is sufficient to prevent delamination during use. The resistance to delamination (peel strength) should be a minimum of 25 gm/inch (average value for a 6-inch strip) in the machine direction. The point to point spacing should be not more than 0.25 inch.

A further object is to laminate two nonwoven webs using a bonding pattern which also serves an aesthetic function by decoratively embossing the laminated fabric. Pleasing designs such as dot patterns or sine wave lines can be embossed with or without customer logos comprising a trademark and or stylized design. The fabric material is then die cut into pads, which are stacked inside a jar filled with aqueous solution The appearance of a customer's logo on each pad repetitively exposes the end user to the brand name of the product, thereby enhancing product identification in the marketplace. The variety of design choices is unlimited.

A further object of the invention is to provide a skin care wipe fabric in which the embossed logo or image will retain its visibility even after the fabric is soaked for extended periods of time in an aqueous solution. This is accomplished by reducing the content of cellulosic fibers in the embossed ply or plies. This ensures that the visibility of the image is not diminished due to swelling of the cellulosic fibers during saturation in the aqueous solution.

Yet another object of the invention is to bond the nonwoven layers in such a way that a soft, lofty laminated fabric of adequate thickness is obtained. The bonding pattern depth has a significant influence on the final thickness of the laminated fabric Pattern depths of up to 50 mils have been used. A controlled test of pattern depth indicated that, with the soft, lofty fabrics generally chosen for this category of fabrics, the magnitude of the reduction in thickness of the laminated fabric dramatically increases when the pattern depth is 0.030 inch or less. For example, a fabric composed of two layers having a total thickness of 0.089 inch before laminating will have a finished thickness of 0.060 inch when bonded on a roll engraved to a depth of 0.040 inch, but a finished thickness of only 0.048 inch when bonded on a roll engraved to a depth of 0.020 inch.

It is noteworthy that the final thickness of the laminated fabric is also affected by the amount of bonding area. Overbonding reduces the thickness of the laminated fabric.

In addition, it is a general object of the invention to provide a laminated skin care wipe material which can be manufactured relatively inexpensively and in a manner which is less time consuming than conventional methods. Correspondingly, it is also an object to provide a laminated skin care wipe material which is cheaper than conventional laminated skin care wipe materials.

This is accomplished in part by reducing the area over which the two plies of the laminated fabric are bonded and by increasing the content of thermally fusible plastic fibers. Naturally, the greater the bonding area, the more energy which must be absorbed by the laminated fabric. Because the supply of electrical power to the ultrasonic horn roll is constant for a given production, any increase in the bonding area requires that ultrasonic bonding occur at slower production line speeds. The application of electrical power for longer durations assures that the ultrasonic energy absorbed by the fabric will be sufficient to achieve bonding over the desired area.

Bond patterns covering an area of 12% or less of the roll surface are utilized to optimize the bonding speed. However, this does not restrict the size of the images which can be formed on the laminated fabric because an array of small bonding areas (e.g., dots or short lines) can be used to compose patterns with visually recognizable images of almost any size (up to the limits of the roll surface).

In accordance with the invention, the production line speed is further enhanced by increasing the content of thermally fusible plastic fibers in the fabric. This is due to the fact that non-thermoplastic fibers insulate the thermoplastic fibers from the heat generated by the applied ultrasonic vibration.

A further object of the invention is to provide a two-sided skin care wipe material having different textures on the respective sides. One side is soft to human touch and is gentle for use with sensitive skin. The other side is rougher and stretches the skin to a greater extent when wiped thereon. This provides an enhanced cleaning effect and a perceived scrubbing action.

Correspondingly, it is an object of the invention to provide a two-ply skin care wipe material in which the plies have differing liquid holding capacities. For example, it is desirable that one ply hold enough liquid to attain a predetermined rate of liquid release during wiping. In contrast, the other ply may hold less liquid, resulting in a weaker lubricating effect of the liquid and an enhanced subjective perception of "scrubbing" when used on the skin.

The foregoing objects are realized in accordance with the invention by providing a laminated fabric material suitable for use in wiping human skin comprising two plies of fibrous material bonded together, wherein each ply of fibrous material is a nonwoven layer comprising at least some thermally fusible plastic fibers. The fiber composition of the laminated fabric material in accordance with the invention may be varied over wide ranges, but the total amount of thermally fusible plastic material in the two plies should be high enough to ensure efficient lamination. In addition, for the side or sides where an image, for example, a logo, is to be bonded into the fabric, the percentage of cellulosic fibers is reduced to ensure that the visibility of the image is not diminished due to swelling of the cellulosic fibers during saturation in aqueous solution.

In accordance with the invention, the total fiber composition for each of the two plies consists of in excess of 50 wt. % thermally fusible plastic fibers. More particularly, one of the plies has a fiber composition of 100 wt. % thermally fusible plastic fibers. This enables the plies to be ultrasonically bonded together at sufficiently high bonding speeds. The side having a fiber composition consisting of 100 wt. % thermally fusible plastic fibers ensures high visibility of the image bonded into one side of the fabric.

Furthermore, the surfaces of at least some of the thermally fusible plastic fibers of both plies have been treated to render the plastic fibers hydrophilic. For example, the plastic fibers are rendered hydrophilic by coating their surfaces with surfactant. The relative hydrophilicity of the plastic fibers makes the laminated fabric material in accordance with the invention suitable for use in skin cleansing because the fabric can be rapidly saturated when soaked in a skin cleansing solution during packaging operations, for example, when a jar containing an aqueous solution is filled with a stack of pads made of the laminated fabric material of the invention.

In accordance with a further feature of the invention, one ply has fibers which are relatively coarse, while the other ply has fibers which are relatively fine. As a result, one side of the laminated fabric feels soft to the human touch, whereas the other side of the laminated fabric feels coarser. The differences in skin texture of the respective sides of the wipe material allow the two sides to be used for different purposes, that is, the relatively rougher side is wiped against the skin when a better cleaning effect and a perceived scrubbing action are desired.

To achieve a sensation of softness requires fine fibers such as 1.5-denier rayon or polyester and/or a low-friction polymer such as polyethylene on the fiber's surface. Fine fibers provide good capillarity and fabrics using such fibers release liquid in response to manual manipulation at a rate appropriate for skin care end uses.

In contrast, coarse fibers, such as 6-denier polyester, form low-density webs having few capillaries and low liquid holding capacity. This phenomenon reduces the lubricating effect of the liquid which saturates the coarse fiber web and enhances the subjective perception on the part of the user of a "scrubbing" action on the skin.

The final product incorporating the laminated wipe material of the invention is nontoxic in skin care uses, that is, is free of formaldehyde. In accordance with a preferred embodiment in which one ply is a chemically bonded nonwoven web of polyester fibers, the binder is styrene butadiene rubber.

In accordance with the method for manufacturing the laminated wipe material of the invention, two plies of nonwoven fibrous material are laminated together in a plurality of bonding areas. Either or both plies may be nonwoven webs formed by thermal bonding, chemical bonding or hydroentanglement. The preferred method of lamination is ultrasonic bonding using opposing anvil roll and horn. During ultrasonic bonding the thermally fusible plastic fibers are melted and resolidified in the bonding areas to join the plies together. The plurality of bonding areas comprise a pattern of regularly spaced bonding spots of geometric shape. In addition, the plurality of bonding areas can further comprise at least one bonding area in the shape of a logo or other image.

Other objects, features and advantages of the present invention will be apparent from the detailed description of the preferred embodiments of the invention which follows.

DETAILED DESCRIPTION OF THE PREFERRED EMBODIMENTS

The laminated fabric material in accordance with the invention comprises two plies of fibrous material bonded together. Each ply of fibrous material is a nonwoven layer comprising thermally fusible plastic fibers. The preferred fiber composition for each of the two plies consists of 50 to 100 wt. % thermally fusible plastic fibers.

The preferred method of lamination is ultrasonic bonding. This is accomplished by feeding the two nonwoven layers of different fiber composition through an ultrasonic bonding production line.

A conventional ultrasonic bonding production line includes an unwind stand having three unwind positions capable of accepting rolls having an outside diameter up to 48". This unwind function requires means for adequately controlling the tension of the unwound fabrics. The tension is closely controlled at all stations. Drafts are usually less than 2% from station to station. In addition, spreading/guiding devices, e.g., bowed rolls, are provided to eliminate wrinkles in the fabric being fed to the bonding station.

The bonding station of the conventional ultrasonic bonding production line includes a driven anvil roll, a compressed air cooling device for cooling the anvil roll, means for applying ultrasonic energy including 7-inch horns and gold boosters, and a fan for cooling the horns. The anvil roll is traditionally constructed of metals such as steel or aluminum.

The line width can be a maximum of 52 inches. Accordingly, a laminated fabric having a width of 52 inches or any narrower width can be made. The production line speed varies from 5-200 fpm. A typical speed for skin care products is 15-50 fpm. The operating efficiency (speed) is controlled by three variables: (1) the percentage of thermoplastic fiber in the product; (2) the weight of the fabric, and (3) the bond pattern area. A higher percentage of thermoplastic fibers allows faster speeds. A greater fabric weight slows down the process. The more bonded area, the slower the speed.

After the nonwoven layers are laminated together in the bonding station, the laminated fabric travels to an inspection station with lights. The fabric is inspected on line and visible defects are cut out.

Following inspection, the laminated fabric is wound on a surface driven winder. Winding is done at normal tensions. Some products are shipped as wound. Others are sent to a slitter for custom slitting to a width required by the customer.

A conventional anvil roll consists of a mechanically engraved or chemically etched metallic roll. Such an anvil roll can be used in conjunction with an ultrasonic horn to laminate the two nonwoven webs in accordance with the invention. The ultrasonic horn usually takes the form of a vibrating flat plate. The webs are laminated between the horn and anvil at a plurality of bonding spots corresponding to the plurality of protrusions extending generally radially outwardly from the engraved or etched metal surface of the anvil roll.

In the following description of the preferred embodiments of the invention, the term "horn side layer" refers to the nonwoven layer which contacts the horn during ultrasonic bonding, while the term "anvil side layer" refers to the nonwoven layer which contacts the anvil during ultrasonic bonding.

In accordance with a first preferred embodiment of the invention, the horn side layer is a hydroentangled nonwoven web having a fiber composition of 50% rayon fibers, 30% polyester fibers and 20% polypropylene fibers. The rayon fibers are Courtaulds #18543 rayon fibers, 1.5 denier×1.5 inch long, semi-dull finish. The polyester fibers are Hoechst-Celanese #290 polyester fibers, 6 denier×2 inch long, dull finish. The polypropylene fibers are Hercules #101 polypropylene fibers, 1.5 denier×1.5 inch long, dull finish. This horn side layer has a fabric weight of 90 gsy.

In the first preferred embodiment, the anvil side layer is a chemically bonded nonwoven web having a composition of 75% polyester fibers and 25% latex binder. The polyester fibers are Hoechst-Celanese #290 polyester fibers, 6 denier×2 inch long, dull finish. The latex binder is Genflo #3060 styrene butadiene rubber latex. This anvil side layer has a fabric weight of 55 gsy. The apparatus for manufacturing the laminated material of the first preferred embodiment includes an anvil roll which embosses a specific "geometric" dot pattern on the anvil side layer.

In accordance with a second preferred embodiment of the invention, the horn side layer is a thermally bonded nonwoven web having a fiber composition of 80% polyester fibers and 20% polyester binder fibers. The polyester fibers are Eastman #411 polyester fibers, 1.5 denier×1.5 inch long. The polyester binder fibers are Hoechst-Celanese #450 polyester fibers, 2.2 denier×1.5 inch long. This horn side layer has a fabric weight of 40 gsy.

In the second preferred embodiment, the anvil side layer is a hydroentangled nonwoven web having a fiber composition of 100% polyester fibers. The polyester fibers are Hoechst-Celanese #290 polyester fibers, 6 denier×2 inch long, dull finish. This anvil side layer has a fabric weight of 34 gsy. The apparatus for manufacturing the second preferred embodiment of the invention includes an anvil roll the surface of which has a "sine wave" pattern thereon and a bond area of 12%.

In accordance with a third preferred embodiment of the invention, the horn side layer is a hydroentangled nonwoven web having a fiber composition of 70% polyester fibers and 30% rayon fibers. The polyester fibers are Hoechst-Celanese #180 polyester fibers, 1.5 denier×1.5 inch long, dull finish. The rayon fibers are Courtaulds #18543 rayon fibers, 1.5 denier×1.5 inch long, semi-dull finish. This horn side layer has a fabric weight of 70 gsy.

In the third preferred embodiment, the anvil side layer is a hydroentangled nonwoven web having a fiber composition of 100% polyester fibers. The polyester fibers are Hoechst-Celanese #180 polyester fibers, 1.5 denier×1.5 inch long, dull finish. This anvil side layer has a fabric weight of 48 gsy. In accordance with this third preferred embodiment of the invention, the anvil roll comprises a garnet wire wrapped on a roll of 10-inch outer diameter. The protrusions on the garnet wire form a dot pattern having 12 dots per inch.

Several categories of nonwoven fabrics are suitable for use in the laminated skin care products in accordance with the invention. Hydroentangled fabrics are generally chosen because the free surface fibers of such fabric are perceived to be very soft when in contact with the skin. Thermally bonded (Novonette) fabrics with a deeply embossed surface are chosen because, when in contact with the skin, they are perceived as having a moderate scrubbing action. Chemically bonded fabrics are chosen as a convenient method of making a low-density, high-loft fabric. When made using coarse fibers and stiff latex binders (e.g. Genflo #3060) and 6-denier polyester fibers, the resulting fabric is perceived as having an aggressive scrubbing action when in contact with the skin.

While hydroentangled, thermally bonded and chemically bonded fabrics are representative of the technologies which can be incorporated in the present invention, these by no means exhaust all of the possibilities. Other nonwoven webs which can be incorporated in the laminated skin cleansing wipe material in accordance with the invention.

Although the invention has been described with reference to preferred embodiments, it will be appreciated that one of ordinary skill in the arts of fiber technology and the manufacture of skin cleansing fabric that fibers other than those disclosed herein could be added to the fiber composition without departing from the scope of the invention. Also one could readily vary the respective weight percentages of the disclosed fiber components without departing from the scope of the invention. There are an almost infinite number of combinations of materials which could be chosen for this category of product and several other fabric-forming methods which can be used, e.g. wet lay, through-air oven bonding, spunbond, etc. All such variations and modifications are intended to be within the scope and spirit of the invention as defined in the claims appended hereto.

I claim:

1. A laminated fabric material suitable for use in wiping human skin, comprising first and second plies of fibrous material bonded together, wherein each of said first and second plies of fibrous material is a nonwoven layer having a fiber composition consisting of at least 50 wt. % thermally fusible plastic fibers, at least one of said nonwoven layers being formed by hydroentangling, and the surfaces of at least some of said thermally fusible plastic fibers of each of said first and second plies have been treated to render said plastic fibers hydrophilic.

2. The laminated fabric material as recited in claim 1, wherein said first ply of fibrous material comprises no cellulosic fibers.

3. The laminated fabric material as recited in claim 2, wherein said first ply has a fiber composition consisting of 100 wt. % thermally fusible plastic fibers.

4. The laminated fabric material as recited in claim 1, wherein said treated surfaces are treated by coating said surfaces with surfactant.

5. The laminated fabric material as recited in claim 3, wherein 100% of said fibers of said first ply contain polyester.

6. The laminated fabric material as recited in claim 1, wherein said second ply of fibrous material comprises cellulosic fibers.

7. The laminated fabric material as recited in claim 6, wherein said cellulosic fibers comprise rayon fibers.

8. The laminated fabric material as recited in claim 1, wherein said first ply of material comprises thermally fusible plastic fibers which are relatively coarse, and said second ply of material comprises thermally fusible plastic fibers which are relatively fine.

9. The laminated fabric material as recited in claim 8, wherein said relatively coarse plastic fibers are made of polyester.

10. The laminated fabric material as recited in claim 1, wherein said first and second plies of fibrous material are ultrasonically bonded together in a plurality of bonding areas, said thermally fusible plastic fibers being melted and resolidified in said bonding areas during said ultrasonic bonding to secure said first ply to said second ply.

11. The laminated fabric material as recited in claim 10, wherein said plurality of bonding areas comprise a pattern of regularly spaced bonding spots of geometric shape.

12. The laminated fabric material as recited in claim 11, wherein said plurality of bonding areas further comprise at least one bonding area in the shape of a logo.

13. The laminated fabric material as recited in claim 7, wherein said thermally fusible plastic fibers in said second ply comprise polypropylene fibers.

14. The laminated fabric material as recited in claim 1, wherein said thermally fusible plastic fibers in said first ply comprise polyester fibers.

15. The laminated fabric material as recited in claim 14, wherein said thermally fusible plastic fibers in said first ply further comprise polyester binder fibers.

16. The laminated fabric material as recited in claim 13, wherein said thermally fusible plastic fibers in said second ply further comprise polyester fibers.

17. The laminated fabric material as recited in claim 5, wherein said first ply of fibrous material comprises polyester fibers which are bonded together by latex binder.

18. The laminated fabric material as recited in claim 17, wherein said latex binder is styrene butadiene rubber.

19. The laminated fabric material as recited in claim 1, wherein said first ply consists of a nonwoven web of 75 wt. % 6-denier polyester fibers chemically bonded by 25 wt. % styrene butadiene rubber, and said second ply consists of a nonwoven web of 50 wt. % 1.5-denier rayon fibers, 30 wt. % 6-denier polyester fibers and 20 wt. % 1.5-denier polypropylene fibers hydroentangled together.

20. The laminated fabric material as recited in claim 1, wherein said first ply consists of a nonwoven web of 100 wt. % 6-denier polyester fibers, and said second ply consists of a nonwoven web of 80 wt. % 1.5-denier polyester fibers thermally bonded by 20 wt. % 2.2-denier polyester binder fibers.

21. The laminated fabric material as recited in claim 1, wherein said first ply consists of a nonwoven web of 100 wt. % 1.5-denier polyester fibers, and said second ply consists of a nonwoven web of 70 wt. % 1.5-denier polyester fibers and 30 wt. % 1.5-denier rayon fibers hydroentangled together.

22. A laminated fabric material suitable for use in a skin cleansing pad, comprising first and second plies of fibrous material ultrasonically bonded together, wherein each of said first and second plies of fibrous material is a nonwoven layer having a total fiber composition consisting of at least 50 wt. % thermally fusible plastic fibers, at least one of said nonwoven layers being formed by hydroentangling, and the surfaces of at least some of said thermally fusible plastic fibers of each of said first and second plies have been treated to render said plastic fibers hydrophilic.

23. The laminated fabric material as recited in claim 22, wherein said first and second plies of fibrous material are ultrasonically bonded together in a plurality of bonding areas, said thermally fusible plastic fibers being melted and resolidified in said bonding areas during said ultrasonic bonding to secure said first ply to said second ply.

24. A method for manufacturing a laminated fabric material comprising the following steps:

forming first and second nonwoven layers, said first nonwoven layer being formed by hydroentangling, each of said first and second nonwoven layers having a fiber composition consisting of at least 50 wt. % thermally fusible plastic fibers, the surfaces of at least some of said thermally fusible plastic fibers of each of said first and second nonwoven layers having been treated to render said plastic fibers hydrophilic; and bonding said first and second nonwoven layers together to form a lamination.

25. The method for manufacturing a laminated fabric material as recited in claim 24, wherein said first and second nonwoven layers are ultrasonically bonded together in a plurality of bonding areas, said thermally fusible plastic fibers being melted and resolidified in said bonding areas during said ultrasonic bonding to secure said first ply to said second ply.

26. The method for manufacturing a laminated fabric material as recited in claim 24, wherein said first nonwoven layer is formed by hydroentangling and said second nonwoven layer is formed by thermal bonding.

27. The method for manufacturing a laminated fabric material as recited in claim 24, wherein said first and second nonwoven layers are formed by hydroentangling.

28. The method for manufacturing a laminated fabric material as recited in claim 24, wherein said first nonwoven layer is formed by chemical bonding and said second nonwoven layer is formed by hydroentangling.

* * * * *